INVENTORS
WESLEY W. PENDLETON
GEORGE W. OSTRANDER
BY

THEIR AGENT

United States Patent Office 3,398,004
Patented Aug. 20, 1968

3,398,004
GLASS COMPOSITION, CONDUCTORS AND COILS INSULATED THEREWITH AND METHOD OF MAKING SAID COMPOSITION
Wesley W. Pendleton, Muskegon, and George W. Ostrander, Muskegon Heights, Mich., assignors to Anaconda Wire and Cable Company, a corporation of Delaware
Filed Jan. 14, 1964, Ser. No. 337,553
36 Claims. (Cl. 106—48)

ABSTRACT OF THE DISCLOSURE

An electrically insulating glass is made up of CaO, BaO, ZnO, $Al_2O_3$ and $SiO_2$. A coating composition contains a suspension of the new glass along with a refractory such as $Cr_2O_3$. Wire is insulated with this suspension in an organic resin solution and coils are formed from such wire.
To make this coating composition a glass frit is formed and screened through a 200 mesh sieve, mixed into an enamel along with particles of refractory and ball milled for at least 96 hours.

Our invention relates to glass-insulated electrical conductors and coils and particularly to such conductors insulated with an alkali-free, boron-free glass of novel composition, and to the method of making a composition for insulating such conductors.

It has been suggested, particularly in applications Ser. Nos. 207, 882, now Patent No. 3,343,984, 178, 349, now Patent No. 3,294,731,; 173, 115, now Patent No. 3,273, 225; wherein one of the present inventors is coinventor, to coat a magnet wire conductor with an enamel comprising a fusible glass, cure the enamel to form an abrasive resistant coating, wind the wire into coils while it is protected by the enamel coating, decompose the organic moiety of the enamel on the coils by heating them in the presence of air, and then increasing the temperature so as to fuse the glass still remaining on the surface of the wires.

Glass is applied to the coils rather than conventional organic insulations to render them servicable at high temperatures and in radiation fields. We have found that, for these purposes, the glass should be free from alkalies or boron, since alkalies impart ionic conductivity that results in high electrical loss factor at elevated temperature and boron has a high cross section to neutrons that will create swelling and disintegration of the glass in high radiation fields. Lead is also undesirable since in a reducing atmosphere it volatilizes at high temperatures, and may reduce to metallic lead. Iron and titanium are in the same category and magnesium oxide reduces the coefficient of thermal expansion which is, of course, objectionable in a wire coating. Beryllia is to be avoided because of health hazards and it is also desirable to avoid carbon, sulfur, and most halogens (except fluorine in $CaF_2$). In the absence of these elements we were faced with the problem of producing a glass composition which would be capable of providing good insulation at high temperatures such as 800° or 850° C. and still be capable of fusion at temperatures below the melting points of copper or silver. It is further required that the glass should remain in position on the wire during the critical period between the decomposition of the organic constituent of the enamel and the fusing of the glass. We have discovered, surprisingly, that our glass will, when admixed with a suitable proportion of refractory, and ball-milled in a suitable enamel, hereinafter to be fully described, remain on the wire during this critical period.

It is an object of our invention to make a glass composition with high electrical resistivity at elevated temperatures.

It is a further object of our invention to make a glass composition suitable for insulating wire exposed to radiation fields.

It is a further object of our invention to make a coating composition with an inorganic moiety that will adhere to metallic wire after the organic material has been decomposed.

It is a further object of our invention to provide an inorganic wire coating with a high coefficient of thermal expansion.

It is a further object of our invention to provide a wire coil capable of operating at high temperatures and remaining free from entrapped moisture.

It is a further object of our invention to provide a glass composition highly insoluble in water and free from affinity therefor.

We have found that a glass composition made up, by weights, of 1–12 parts of CaO, 30–50 parts of BaO, 4.8–12 parts of ZnO, 0.5–5 parts of $Al_2O_3$ and 30–50 parts of $SiO_2$ is useful in the practice of our invention. A preferred composition has 2–10 parts of CaO, 33–46 parts of BaO, 5–8 parts of ZnO, 1–3 parts of $Al_2O_3$, and 34–40 parts of $SiO_2$; and a composition that has worked particularly well has 9 parts of CaO, 45 parts of BaO, 5.8 parts of ZnO, 2.2 parts of $Al_2O_3$, and 38 parts of $SiO_2$. It will, of course, be understood, that in expressing the composition of our glass in terms of the oxides of the glass forming elements we are following standard scientific practice that permits fair comparisons to be made between different compositions and does not necessarily limit the molecular constitution of the glass itself. We do not wish to be limited by any theoretical explanation of the function served by the different elements of our glass composition but believe, at the time this is written, that the silica contributes good electrical properties but has a low coefficient of expansion. This is compensated by the barium oxide which fluxes to barium silicate. The ZnO and CaO also serve as fluxes while the alumina raises the viscosity, limits devitrification, and improves the electrical resistance.

When $CaF_2$ is substituted for a portion of the CaO the fusing point is lowered in a useful manner and we wish to include such compositions within the scope of our invention.

EXAMPLE I

A glass was prepared having the composition:

| | Parts by weight |
|---|---|
| BaO | 45 |
| $SiO_2$ | 38 |
| $Al_2O_3$ | 2.2 |
| CaO | 9.0 |
| ZnO | 5.8 | and found to have a pyrometric cone equivalent temperature (PEC) of 850° C.

We have found that when the glass frit of the composition we have invented was ball-milled with refractory particles and then deposited on a wire in a manner described hereinbelow the cut-through strength at very high temperatures, that is, of the order of 800° C., and even in excess of 900° C. of the insulation coating was greatly increased without, surprisingly, causing a loss of the ability of the coating to fuse into a continuous coating, and to remain flexible. We prefer to use refractory particles of $Cr_2O_3$ but include, within the scope of our invention, refractory particles of $Al_2O_3$, $CaSiO_3$, $MgO$, $ZrO_2$ and $TiO_2$ although the $TiO_2$ can be used only where the apparatus will not be heated in a reducing atmosphere.

In the glass-refractory totality the glass fraction should be 68–90 parts by weight and the refractory 10–32 parts in order to form a continuous coating. We prefer, however, a mixture of 72–80 parts of glass and 20–28 parts of refractory.

For application on a wire the glass frit and the refractory particles are suspended in a magnet wire enamel which may be one of a large number of known types of magnet wire enamels such as a silicone wire enamel. A suitable enamel is manufactured by Dow Corning as DC 1090 Silicone and comprises about 80% of polyethylene terephthalate resin and 20% of silicone resin dissolved in xylene to a 40% solids content. Other enamels included in the scope of our invention are epoxies, polyvinyl acetals, polyamides, polyimides, polyurethanes, acrylics and cellulosics all of which have been used for low-temperature magnet wire coatings. We have discovered that it is necessary to add to the organic enamel a much higher proportion of the inorganic glass-refractory mixture than would appear reasonable to a person skilled in the art of wire coating, in order to obtain a continuous inorganic coating on the wire, and one that will remain in place after the organic matter has been decomposed but before the glass has fused or sintered. The proper proportions depend on the wire size and for fine wire, such as #30 A.W.G., we find that the weight of inorganic particles should be at least 90% at the weight of the resin solids and preferably should equal the weight of the resin solids. For coating size 18 A.W.G. wire, however, the inorganic-particle to organic-resin ratio may be as low as 0.25 to 1.

We have further found that a very fine particle size is necessary for the glass-refractory particles. These should be no larger than 74 microns and pass through a 200 mesh screen, and are further reduced by ball milling for at least 96 hours and preferably for a week.

It should not be thought that, since the organic enamel is eventually to be decomposed, its properties are matters of no consequence. On the contrary the enamel used in our invention is required to have flow qualities that permit it to be applied even when heavily loaded with inorganic solids, and it is required to be flexible and abrasion resistant during the winding of the coils. Furthermore high dielectric strength and freedom from insulation discontinuities must be maintained so that the wire can be tested electrically prior to the winding of coils and fusing the same. Coating enamel manufactured by the method improvements we have invented has surprisingly proven to be of superior quality in spite of the high loading of glass, as shown below.

EXAMPLE II

A high temperature enamel was prepared as follows. A glass, having the composition of Example I was melted and shattered by quenching in the usual manner and ground along with 16% of the weight of the glass $Cr_2O_3$. The ground glass-refractory mixture passing a 200 mesh screen was ball-milled for a week in a silicone enamel comprised of resin and xylene having a 40% resin content, and the enamel applied on a commercial type enamelling oven to #18 A.W.G. Iconel-clad silver wire (Iconel is a trademark of The International Nickel Co., Inc. for a nickel alloy of 76% nickel, 16% chromium, and 8% iron). The results of testing the enamelled wire are shown in Table I.

| | |
|---|---|
| Appearance | Same as conventional enamelled wire in smoothness. |
| Flexibility | No cracks when wrapped around a mandrel equal to wire size. |
| Abrasion resistance | 30 strokes—200 g. load. |
| Windability | Good. |
| Dielectric strength | 2000 volts per mil. |
| Exposure to: | |
| $0.85 \times 10^{20}$ nvt fast neutrons | No visual or electrical change. |
| $3.38 \times 10^{13}$ ergs/gmC gamma rays | No visual or electrical change. |

Method

In the method of our invention a glass frit of our composition is prepared in the known manner of preparing a glass melt and quenching the molten glass in water to form shattered particles. The glass frit hereinabove described is ground, preferably dry, along with 10–32% (preferably 20–28%) of refractory, based on the combined glass-refractory weight, to pass a 200 mesh screen, and the particles passing the screen are added to a magnet wire enamel which is preferably a silicone enamel such as DC 1090. This enamel has a 40% solid content of 20% silicone resin and 80% polyester dissolved in xylene. The enamel containing the added glass and refractory is ball-milled, preferably for one week and at least for 96 hours. Suitable ball-mills are those that have an alumina cylinder and alumina balls. The resulting enamel is applied to a high-temperature magnet wire conductor, preferably on conventional magnet wire coating equipment. Such a conductor may be Inconel-clad silver, it may be copper wire of the type described in application Ser. No. 248, 328, assigned to the assignee of the present invention, or other suitable wire selected to withstand the intended operating temperature of the apparatus and the fusion temperature of the frit. The enamel coating preferably embodies the application of a plurality of layers, each baked dry prior to the application of the succeeding layer. The wire is then formed into the desired coil which is placed in an oven, which in the preferred embodiment has access to oxygen, either continuously or intermittently so as to thoroughly burn off the organic resin. Our invention is not limited, however, to oxidative decomposition of the enamel, and where volatilizable enamels are used the oven may not provide access to oxygen. We prefer to decompose the resin at a temperature of 500° C. with alternate 15 minute cycles of air and vacuum, the number and time of the cycles depending on the coil dimensions. When the resinous material has been completely removed, the coil is fired for 10 minutes at 900° C., either by raising the temperature in the decomposition oven or by transferring the coil to another oven. When a vacuum oven is used for removing the resin, since vacuum ovens capable of reaching fusion temperatures would be unduly costly, it is much preferred to have a separate oven for the fusion. During the transfer of the coil from the one oven to the other, however, the coil is in the delicate condition of having a coating of glass without either a resinous binder or a sintered adhesion between the particles. That our process has been successful in producing inorganic-insulated coils of high quality is shown by Table II of test results for coils made by this process.

TABLE II

Properties of inorganic insulation after firing—

| | |
|---|---|
| Thickness | 0.7 mils. |
| Apparent density | 2.0–2.4. |
| Pyrometric cone equivalent | 010 (bends at 890° C). |
| Sintering temperature | 920° C. |
| Volatilization in high vacuum at 850° C | $Cr_2O_3$ trace. Zno trace. All others—none |
| Thermal expansion | $10.2 \times 10^{-6}$ per °C. |
| Volume resistivity at— | |
| 25° C | Over $10^7$ megohm-cm. |
| 250° C | $10^7$ megohm-cm. |
| 500° C | 800 megohm-cm. |
| 750° C | 5.0 megohm-cm. |
| 850° C | 1.3 megohm-cm. |
| Flexibility | Good—but not sufficient for winding after firing. |
| Chemical resistance | Excellent. |
| Heat shock | Good. |
| Moisture resistance | 100 V/mil at 100% R-H. |
| Dielectric strength, | temp., °C.: Volts/Mil: |
| | 25 ____ 300. |
| | 250 ____ 250. |
| | 500 ____ 150. |
| | 750 ____ 125. |
| | 850 ____ 100. |

Figure 1:
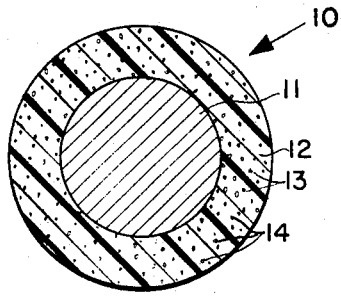
FIGURE 1 shows a section of a wire insulated with the enamel of our invention.

An enamelled wire, indicated generally by the numeral 10, has a metal conductor 11 covered with magnet wire enamel 12 in which are embedded very finely divided and evenly dispersed particles 13 of glass of the composition hereinabove described. Also embedded in the enamel 12 are particles 14 of a refractory, such as $Cr_2O_3$. The weights of the glass and refractory particles may vary from 25 to 100% of the weight of the organic matter.

Figure 2:
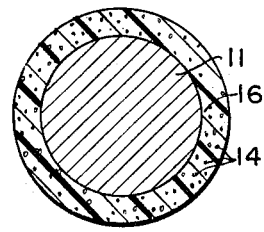
FIGURE 2 shows the section of FIGURE 1 after decomposing the resin and fusing the glass.

In FIGURE 2 the wire has been fired to decompose the organic matter and fuse or sinter the glass particles 13. The glass now forms a continuous matrix 16 in which the refractory particles 14, which weight from 10–32% of the glass-refractory mixture, are dispersed.

Figure 3:
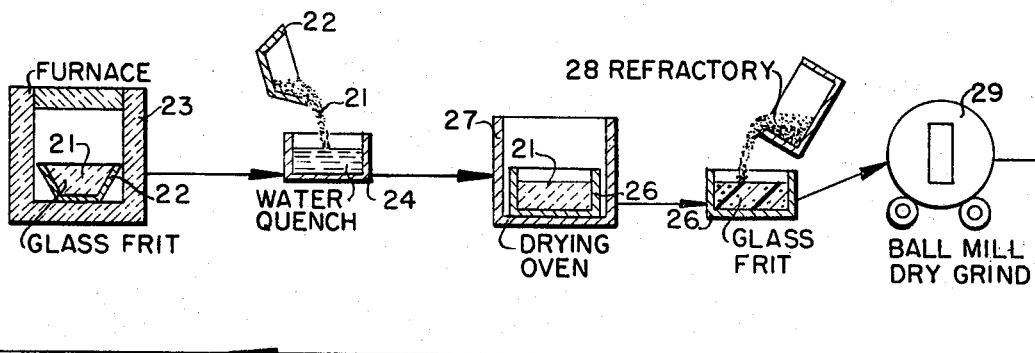
FIGURE 3 is a diagrammatic representation of the process of our invention.
Figure 3:
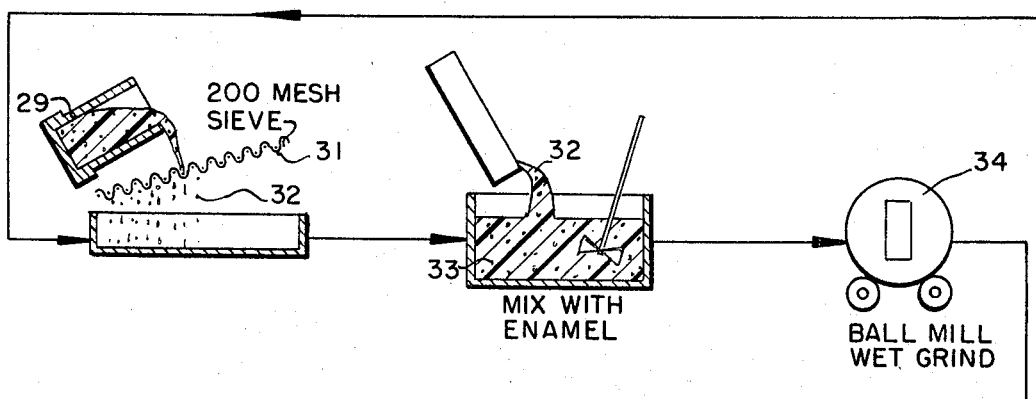
Figure 3:
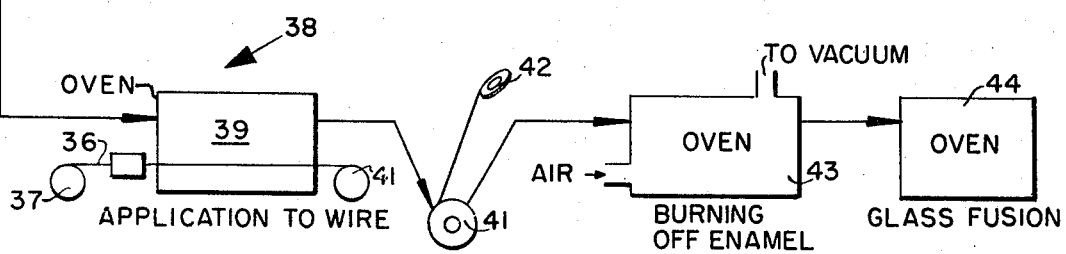

FIGURE 3 shows an embodiment of the process of our invention wherein a glass frit composition 21 is melted in a crucible 22 in a glass furnace 23. The glass is shattered by quenching it in water in a tank 24, from which it is removed in a container 26 and dried in a drying oven 27. Particles 28 of refractory are added to the glass frit 21 in proportions that have been disclosed hereinabove and the mixture is dry ground to 200 mesh in a ball-mill 29. After grinding, the mixture is passed through a 200 mesh sieve 31 as a fine homogeneous powder 32. This powder is introduced into a magnet wire enamel 33 with constant stirring to assure a good dispersion and ball-milled for a week in a ball-mill 34. The ball-milled product is applied to a wire 36 paid from a spool 37 in a standard magnet wire applicator, indicated generally by the numeral 38, which includes an oven 39, whence it is taken up on a spool 41. The passage through the apparatus 38 preferably involves a plurality of reentries so that more than one coat of enamel is applied and cured. From the spool 41 the coated wire is wound into a coil 42. A plurality of the coils 42 are placed in a vacuum oven 43 where the organic matter is burned off by alternating cycles of exposure to air and vacuum at 500–600° C. Thence the coils are placed in a high-temperature oven 44 capable of heating them to 900° C. where the wire coating is sintered.

It is expected that coils of the type described will be encapsulated in a high-temperature encapsultant such, for example, as that described in applicaion Ser. No. 165,392 assigned to the assignee of the present invention.

We have invented a new and useful glass frit composition, insulated wire, and method for which we desire an award of Letters Patent.

We claim:

1. A glass frit composition consisting of:

| | Parts by weight |
|---|---|
| CaO | 1–12 |
| BaO | 30–50 |
| ZnO | 4.8–12 |
| $Al_2O_3$ | 0.5–5 |
| $SiO_2$ | 30–45 |

2. A glass frit composition consisting of:

| | Parts by weight |
|---|---|
| CaO | 2–10 |
| BaO | 33–46 |
| ZnO | 5–8 |
| $Al_2O_3$ | 1–3 |
| $SiO_2$ | 34–40 |

3. A glass frit composition consisting of approximately:

| | Parts by weight |
|---|---|
| CaO | 9 |
| BaO | 45 |
| ZnO | 5.8 |
| $Al_2O_3$ | 2.2 |
| $SiO_2$ | 38 |

4. A coating composition consisting essentially of a suspension in a magnet wire enamel, consisting essentially of a solvent and an organic resin, of:
  (A) 68–90 parts by weight of particles of a glass frit composition consisting essentially of:
   (a) 1–12 parts of a calcium compound selected from the group consisting of CaO and mixtures of CaO and $CaF_2$,
   (b) 30–50 parts of BaO,
   (c) 4.8–12 parts of ZnO,
   (d) 0.5–5 parts of $Al_2O_3$, and
   (e) 30–45 parts of $SiO_2$, and
  (B) 10–32 parts by weight of particles of electrically insulating refractory.

5. The coating composition of claim 4 wherein said refractory is $Cr_2O_3$.

6. A coating composition consisting essentially of a suspension in a magnet wire enemal, consisting essentially of a solvent and an organic resin, of:
  (A) 72–80 parts by weight of particles of a glass frit consisting essentially of:
   (a) 2–10 parts of a calcium compound selected from the group consisting of CaO and mixtures of CaO and $CaF_2$,
   (b) 33–46 parts of BaO,
   (c) 5–8 parts of ZnO,
   (d) 1–3 parts of $Al_2O_3$, and
   (e) 34–40 parts of $SiO_2$, and
  (B) 20–28 parts by weight of particles of electrically insulating refractory.

7. The coating composition of claim 6 wherein said refractory is $Cr_2O_3$.

8. A fluid composition for coating wire and the like consisting essentially of:
  (A) a silicone enamel consisting essentially of:
   (a) a solvent, and
   (b) silicone and polyethylene terephthalate resin dissolved in said solvent,
  (B) particles of a glass frit suspended in said enamel, said frit consisting essentially of:
   (a) 1–12 parts of calcium compound selected from the group consisting of CaO and mixtures of CaO and $CaF_2$,
   (b) 30–50 parts of BaO,
   (c) 4.8–12 parts of ZnO,
   (d) 0.5–5 parts of $Al_2O_3$, and
   (e) 30–45 parts of $SiO_2$, and (C) particles of electrically insulating refractory suspended in said enamel,
   (a) the weight of said refractory being 10–32% of the weight of said frit and refractory, and
   (b) the weight ratio of said frit and refractory to said resin being at least 0.25 to 1, and
(D) both named of said particles passing 200 mesh.

9. The composition of claim 8 wherein said refractory is $Cr_2O_3$.

10. The composition of claim 8 wherein the total of said particles comprises at least 90% of said resin, by weight.

11. A fluid composition for coating wire and the like consisting essentially of:
(A) a silicone enamel consisting essentially of:
   (a) a solvent, and
   (b) silicone and polyethylene terephthalate resin dissolved in said solvent,
(B) particles of a glass frit suspended in said enamel, said frit consisting essentially of:
   (a) 2–10 parts of calcium compound selected from the group consisting of CaO and mixtures of CaO and $CaF_2$,
   (b) 33–46 parts of BaO
   (c) 5–8 parts of ZnO,
   (d) 1–3 parts of $Al_2O_3$, and
   (e) 34–40 parts of $SiO_2$ and
(C) particles of electrically insulating refractory suspended in said enamel,
   (a) the weight of said refractory being 20–28% of the weight of said frit and refractory, and
   (b) the weight ratio of said frit and refractory to said resin being at least 0.25 to 1, and
(D) both named of said particles passing 200 mesh.

12. The composition of claim 11 wherein said refractory is $Cr_2O_3$.

13. The composition of claim 11 wherein the total of said particles comprises at least 90% of said resin, by weight.

14. A fluid composition for coating wire and the like consisting essentially of:
(A) a magnet wire enamel consisting essentially of:
   (a) a solvent, and
   (b) an organic magnet wire enamel resin dissolved in said solvent,
(B) particles of a glass frit suspended in said enamel, said frit consisting essentially of:
   (a) 2–10 parts of calcium compound selected from the group consisting of CaO and mixtures of CaO and $CaF_2$,
   (b) 33–46 parts of BaO,
   (c) 5–8 parts of ZnO,
   (d) 1–3 parts of $Al_2O_3$, and
   (e) 34–40 parts of $SiO_2$, and
(C) particles of electrically insulating refractory suspended in said enamel,
   (a) the weight of said refractory being 10–32% of the weight of said frit and refractory, and
   (b) the weight ratio of said frit and refractory to said resin being at least 0.25 to 1, and
(D) both named of said particles passing 200 mesh.

15. The composition of claim 14 wherein said refractory is $Cr_2O_3$.

16. The composition of claim 14 wherein the total of said particles comprises at least 90% of said resin, by weight.

17. A fluid composition for coating wire and the like comprising:
(A) an organic enamel consisting essentially of:
   (a) a solvent and
   (b) a magnet wire enamel resin dissolved in said solvent,
(B) particles of a glass frit suspended in said enamel, said frit consisting essentially of:
   (a) 2–10 parts of calcium compound selected from the group consisting of CaO and mixtures of CaO and $CaF_2$,
   (b) 33–46 parts of BaO,
   (c) 5–8 parts of ZnO,
   (d) 1–3 parts of $Al_2O_3$, and
   (e) 34–40 parts of $SiO_2$, and
(C) particles of electrically insulating refractory suspended in said enamel,
   (a) the weight of said refractory being 20–28% of the weight of said frit and refractory, and
   (b) the ratio of the weight of said frit and refractory to said resin being at least 0.25% to 1, and
(D) both named of said particles passing 200 mesh.

18. The composition of claim 17 wherein said refractory is $Cr_2O_3$.

19. The composition of claim 17 wherein the total of said particles comprises at least 90% of said resin, by weight.

20. An insulated wire comprising:
(A) a metallic conductor,
(B) an abrasion-resistant dielectric wall covering the surface of said conductor consisting essentially of:
   (a) an organic magnet wire enamel resin, and
   (b) inorganic particles dispersed in said resin,
      (1) 68–90% of said particles being a glass frit consisting essentially of:
         1–12 parts of calcium compound selected from the group consisting of CaO and mixtures of CaO and $CaF_2$,
         30–50 parts of BaO,
         4.8–12 parts of ZnO,
         0.5–5 parts of $Al_2O_3$, and
         30–45 parts of $SiO_2$, and
      (2) 10–32% of said particles being an electrically insulating refractory and
      (3) the weight ratio of said particles to said resin being at least 0.25 to 1.

21. The wire of claim 20 wherein said refractory is $Cr_2O_3$.

22. An insulated wire comprising:
(A) a metal conductor,
(B) an abrasion-resistant dielectric wall covering the surface of said conductor consisting essentially of:
   (a) an organic magnet wire enamel resin, and
   (b) inorganic particles dispersed in said resin,
      (1) 72–80% of said particles being a glass frit consisting essentially of:
         2–10 parts of calcium compound selected from the group consisting of CaO and mixtures CaO and $CaF_2$,
         33–36 parts of BaO,
         5–8 parts of ZnO,
         1–3 parts of $Al_2O_3$, and
         34–40 parts of $SiO_2$, and
      (2) 20–28% of said particles being an electrically insulating refractory, and
      (3) the weight ratio of said particles to said resin being at least 0.25 to 1.

23. The wire of claim 22 wherein said refractory is $Cr_2O_3$.

24. An electrical coil comprising a plurality of turns of insulated wire consisting essentially of:
(A) a metallic conductor,
(B) a fused glass composition surrounding said conductor consisting essentially of:
   (a) 1–12 parts of calcium compound selected from the group consisting of CaO and mixtures of CaO and $CaF_2$,
   (b) 30–50 parts of BaO,
   (c) 4.8–12 parts of ZnO,
   (d) 0.5–5 parts of $Al_2O_3$, and
   (e) 30–45 parts of $SiO_2$.

25. An electrical coil comprising a plurality of turns of insulated wire consisting essentially of:
(A) a metallic conductor,
(B) a fused glass composition surrounding said conductor consisting essentially of:
  (a) 2–10 parts of calcium compound selected from the group consisting of CaO and mixtures of CaO and $CaF_2$,
  (b) 33–46 parts of BaO,
  (c) 5–8 parts of ZnO,
  (d) 1–3 parts of $Al_2O_3$, and
  (e) 34–40 parts of $SiO_2$.

26. An electrical coil comprising a plurality of turns of insulated wire consisting essentially of:
(A) a metallic conductor,
(B) a fused composition surrounding said conductor consisting essentially of:
  (a) a fused glass consisting essentially of:
    (1) 1–12 parts of calcium compound selected from the group consisting of CaO and mixtures of CaO and $CaF_2$,
    (2) 30–50 parts of BaO,
    (3) 4.8–12 parts of ZnO,
    (4) 0.5–5 parts of $Al_2O_3$, and
    (5) 30–45 parts of $SiO_2$, and
  (b) electrically insulating refractory particles
    (1) weighing 10–32% of said glass and refractory and
    (2) evenly dispersed therein.

27. The coil of claim 26 wherein said refractory particles are $Cr_2O_3$.

28. An electrical coil comprising a plurality of turns of insulated wire consisting essentially of:
(A) a metallic conductor,
(B) a fused composition surrounding said conductor consisting essentially of:
  (a) a fused glass consisting essentially of:
    (1) 2–10 parts of calcium compound selected from the group consisting of CaO and mixtures of CaO and $CaF_2$,
    (2) 33–46 parts of BaO,
    (3) 5–8 parts of ZnO,
    (4) 1–3 parts of $Al_2O_3$, and
    (5) 34–40 parts of $SiO_2$, and
  (b) electrically insulating refractory particles
    (1) weighing 20–28% of said glass and refractory, and
    (2) evenly dispersed therein.

29. The coil of claim 28 wherein said refractory particles are $Cr_2O_3$.

30. The method of making a fluid composition for coating wire and the like comprising the steps of:
(A) forming a particulate glass frit consisting essentially of:
  (a) 1–12 parts of calcium compound selected from the group consisting of CaO and mixtures of CaO and $CaF_2$,
  (b) 30–50 parts of BaO,
  (c) 4.8–12 parts of ZnO,
  (d) 0.5–5 parts of $Al_2O_3$, and
  (e) 30–45 parts of $SiO_2$,
(B) mixing said frit into an enamel consisting essentially of:
  (a) a solvent and
  (b) an organic magnet wire enamel resin,
(C) also mixing electrically insulating refractory particles into said enamel,
  (a) said particles weighing 10–32% of the weight of said frit and refractory, and
  (b) the ratio of said frit and said refractory to said resin being at least 0.25 to 1, and
(D) ball-milling said enamel comprising said frit and said refractory particles for a period of at least 96 hours.

31. The method of claim 30 wherein said refractory particles are $Cr_2O_3$.

32. The method of making a fluid composition for coating wire and the like comprising the steps of:
(A) forming a particulate glass frit consisting essentially of:
  (a) 1–12 parts of calcium compound selected from the group consisting of CaO and mixtures of CaO and $CaF_2$,
  (b) 30–50 parts of BaO,
  (c) 4.8–12 parts of ZnO,
  (d) 0.5–5 parts of $Al_2O_3$, and
  (e) 30–45 parts of $SiO_2$,
(B) screening said frit through a 200 mesh screen,
(C) mixing said frit passing said screen into an enamel consisting essentially of:
  (a) a solvent and
  (b) an organic magnet wire enamel resin,
(D) also mixing electrically insulating refractory particles into said enamel,
  (a) said particles passing 200 mesh,
  (b) said particles weighing 10–32% of the weight of said frit and refractory, and
  (c) the ratio of said frit and said refractory to said resin being at least 0.25 to 1, and
(E) ball-milling said enamel comprising said frit and said refractory particles for a period of at least 96 hours.

33. The method of claim 32 wherein said refractory particles are $Cr_2O_3$.

34. A glass frit composition consisting of:

| | Parts by weight |
|---|---|
| A compound selected from the group consisting of CaO and CaO plus $CaF_2$ | 1–12 |
| BaO | 30–50 |
| ZnO | 4.8–12 |
| $Al_2O_3$ | 0.5–5 |
| $SiO_2$ | 30–45 |

35. A glass frit composition consisting of:

| | Parts by weight |
|---|---|
| A compound selected from the group consisting of CaO and CaO plus $CaF_2$ | 2–10 |
| BaO | 33–46 |
| ZnO | 5–8 |
| $Al_2O_3$ | 1–3 |
| $SiO_2$ | 34–40 |

36. A glass frit composition consisting of approximately:

| | Parts by weight |
|---|---|
| A compound selected from the group consisting of CaO and CaO plus $CaF_2$ | 9 |
| BaO | 45 |
| ZnO | 5.8 |
| $Al_2O_3$ | 2.2 |
| $SiO_2$ | 38 |

References Cited

UNITED STATES PATENTS

| | | | |
|---|---|---|---|
| 2,515,941 | 7/1950 | Stookey | 106—52 |
| 2,523,362 | 9/1950 | Fraser et al. | 106—52 |
| 2,527,693 | 10/1950 | Armistead | 106—52 |
| 3,222,219 | 12/1965 | Saunders et al. | 106—48 |

JAMES E. POER, *Primary Examiner.*